Aug. 9, 1949.                H. C. HARBERS                2,478,658
            MECHANISM FOR TRANSFERRING A BODY FROM A TRAILER
                 CHASSIS TO A TRUCK CHASSIS AND VICE VERSA
Filed March 8, 1946                                  7 Sheets-Sheet 5
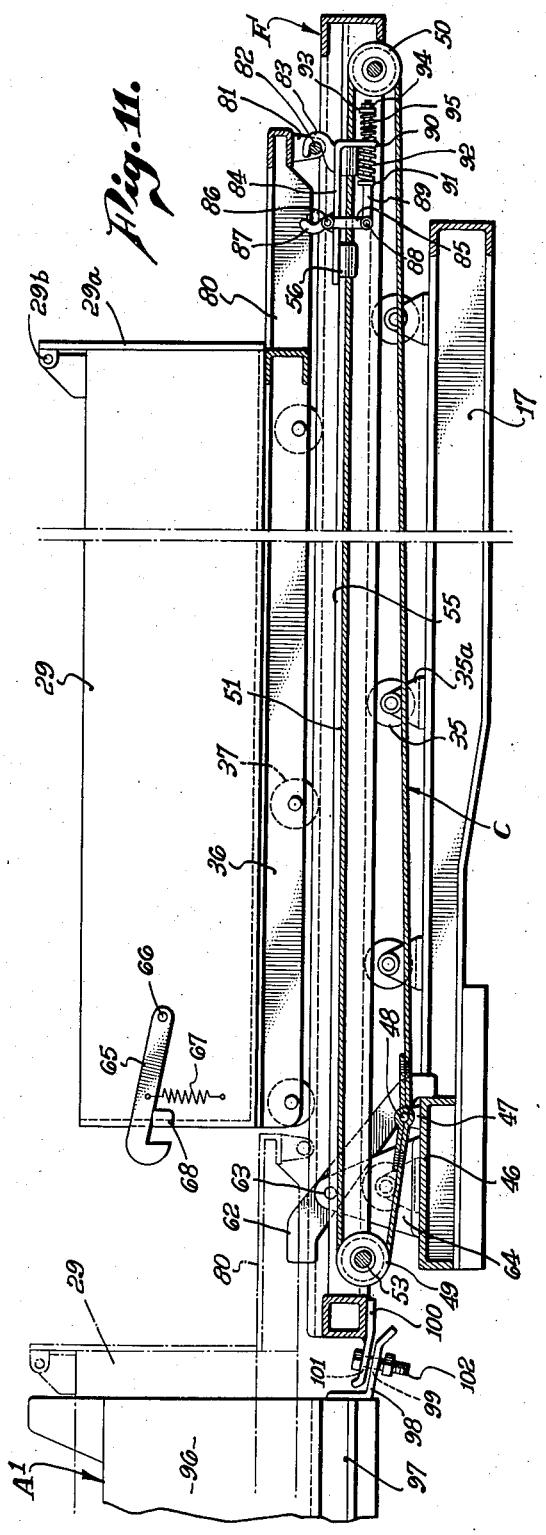
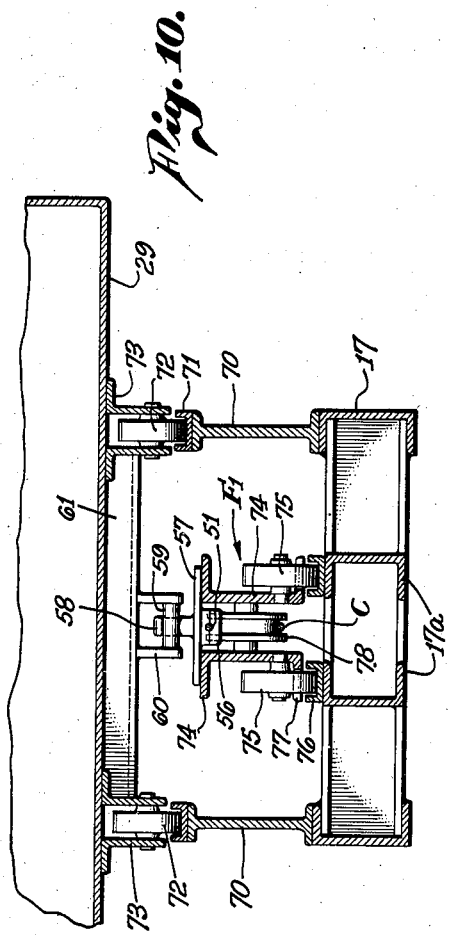
INVENTOR
Henry C. Harbers
BY
Edwin D. Jones.
ATTORNEY INVENTOR
Henry C. Harbers
BY
Edwin D. Jones.
ATTORNEY Aug. 9, 1949.   H. C. HARBERS   2,478,658
MECHANISM FOR TRANSFERRING A BODY FROM A TRAILER
CHASSIS TO A TRUCK CHASSIS AND VICE VERSA
Filed March 8, 1946   7 Sheets-Sheet 7
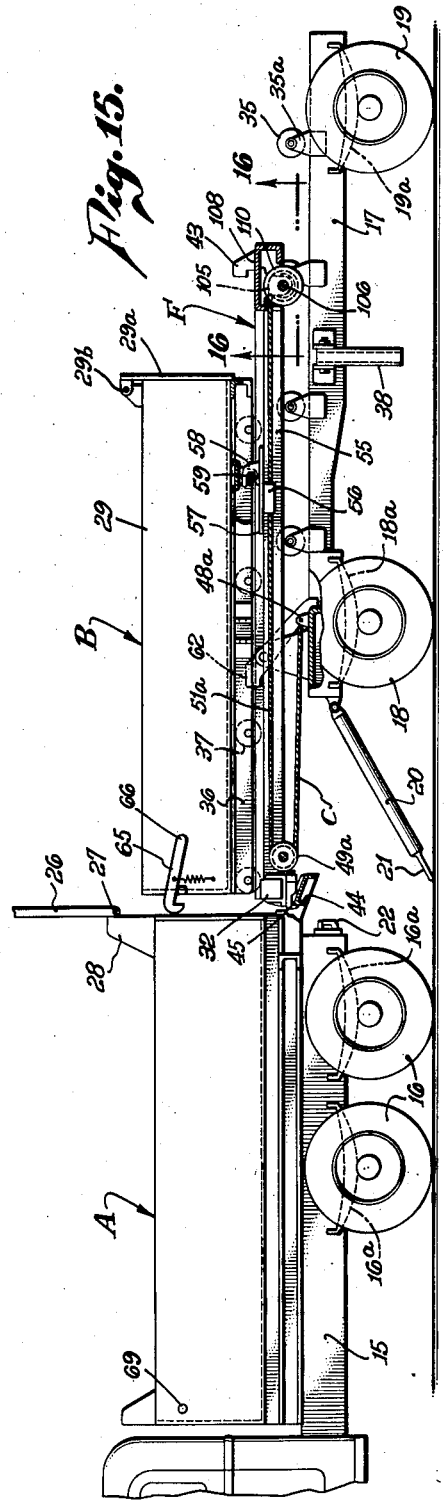
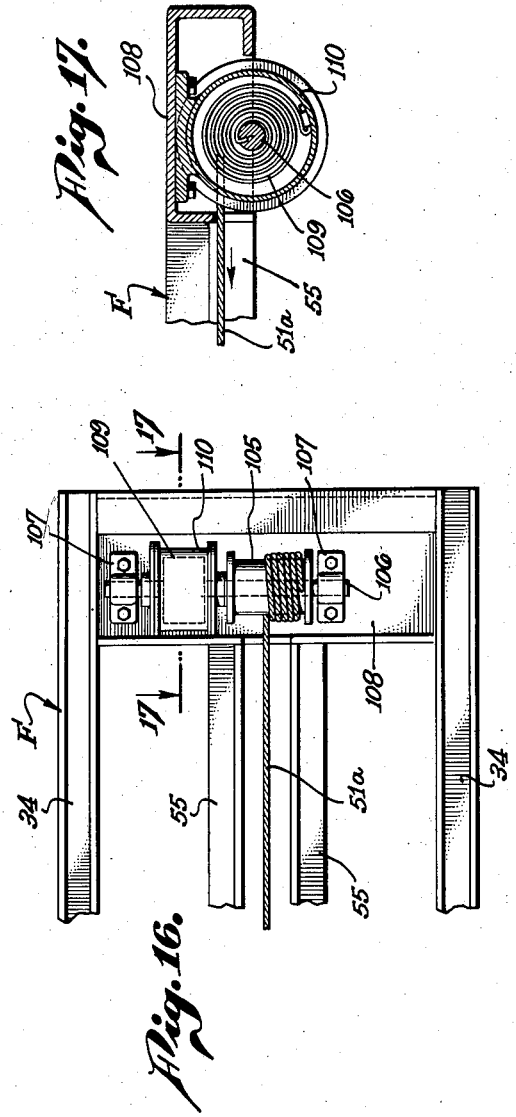
INVENTOR
*Henry C. Harbers*
BY *Edwin D. Jones.*
ATTORNEY Patented Aug. 9, 1949

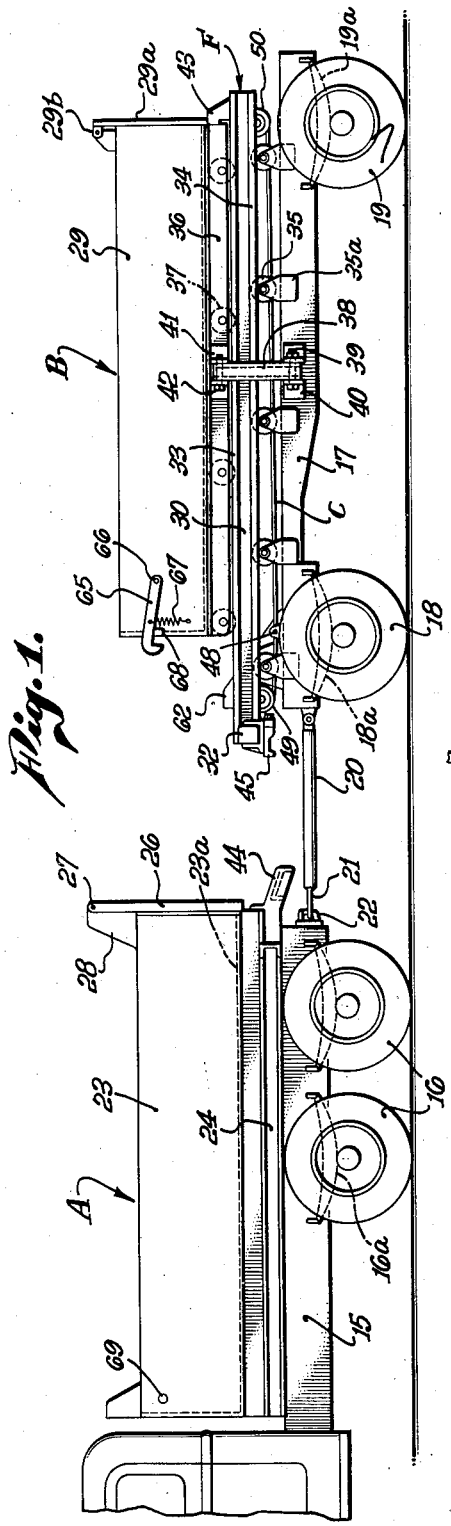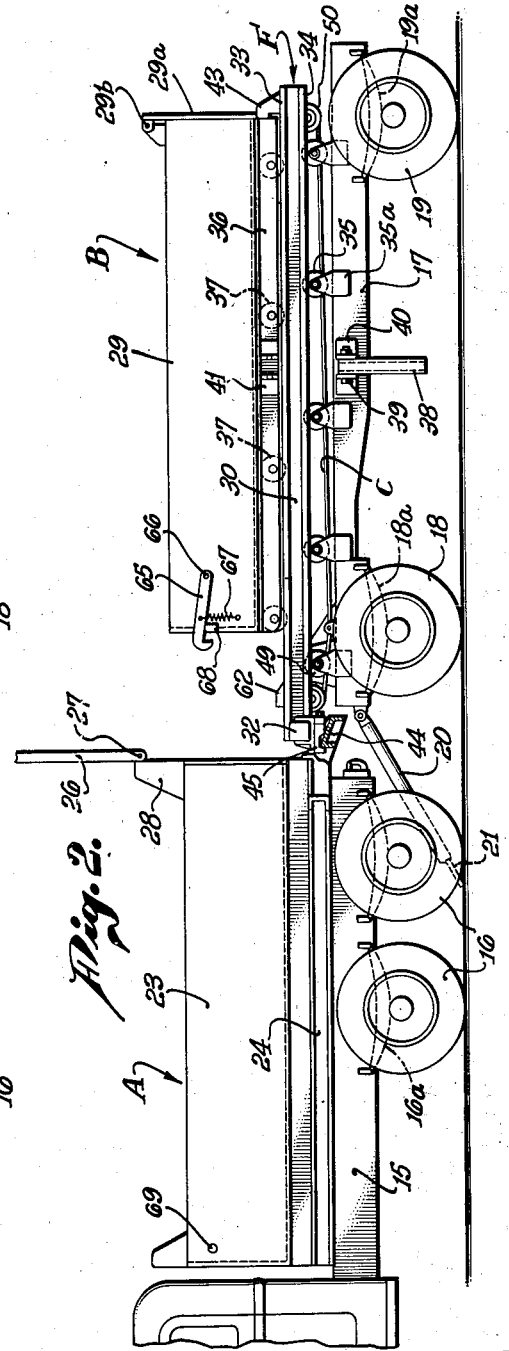

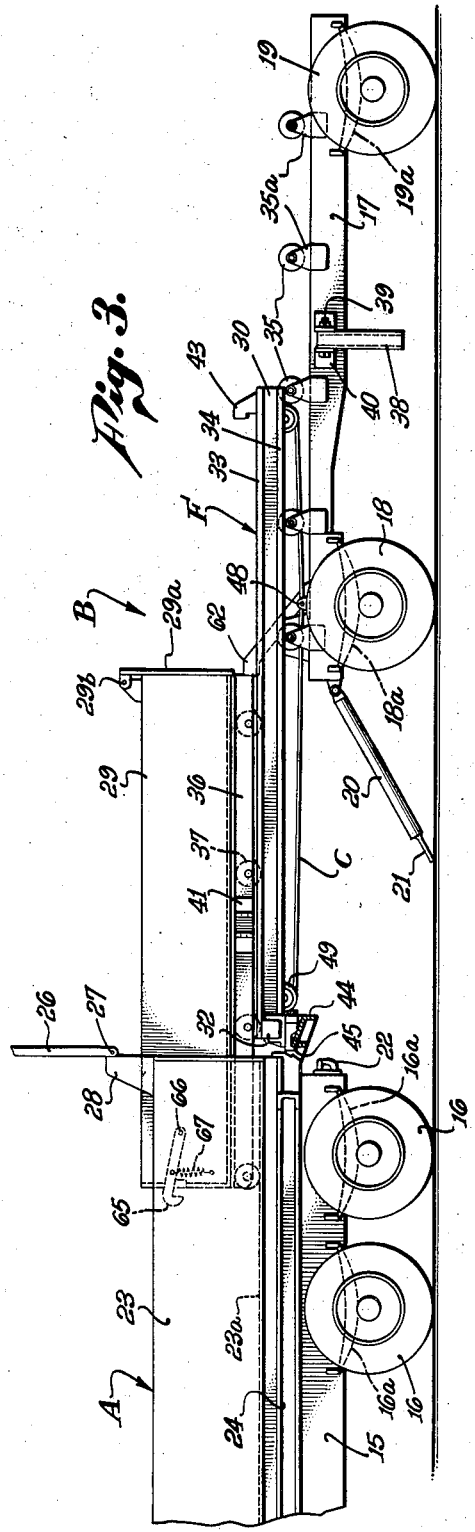

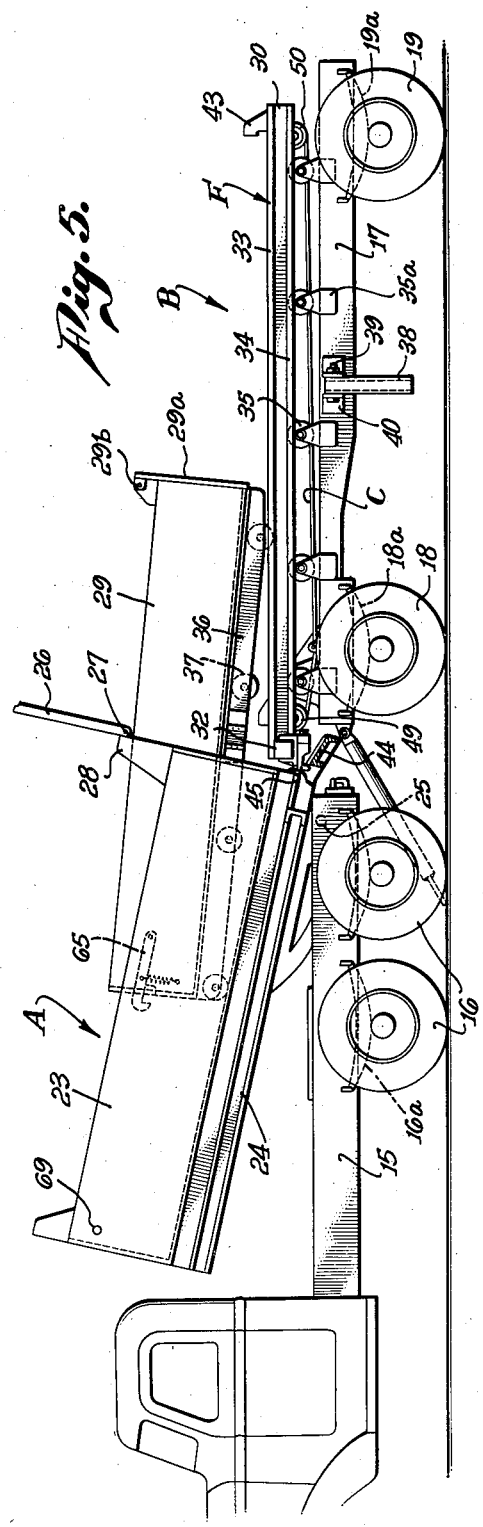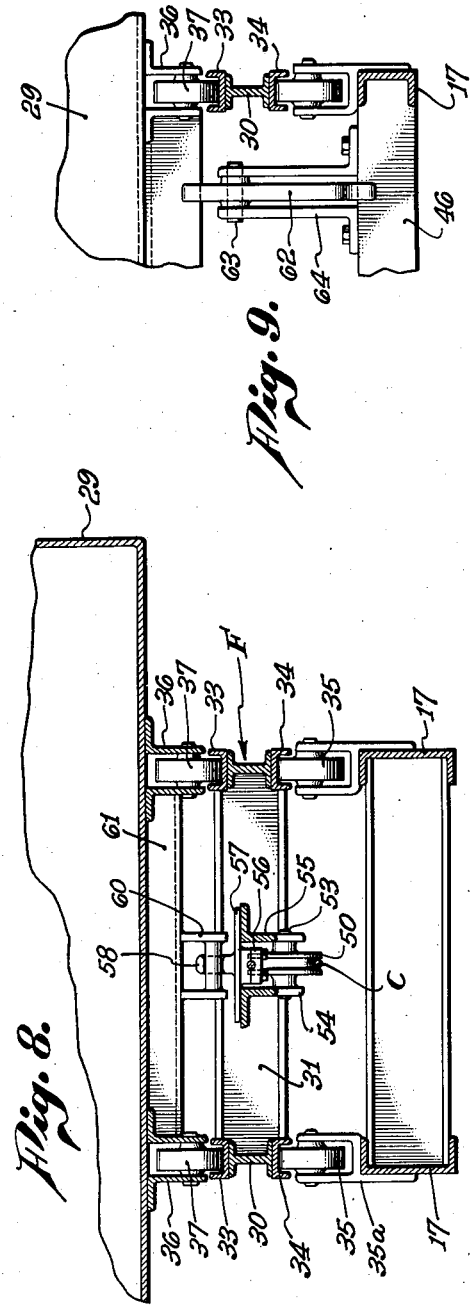

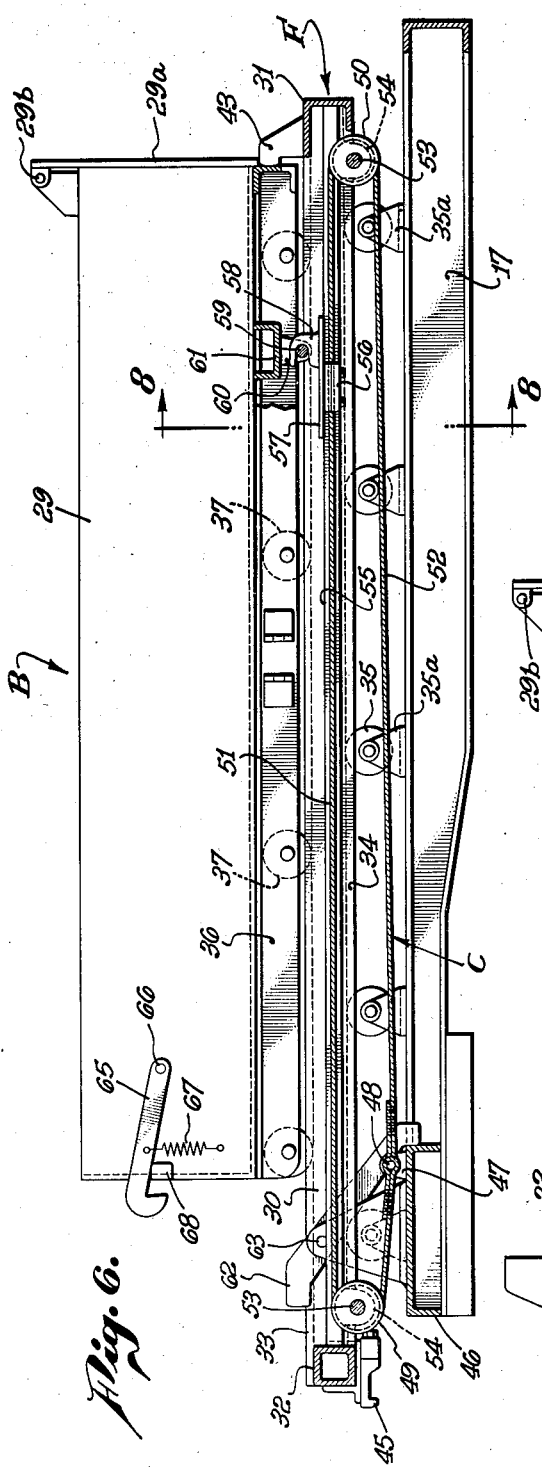

2,478,658

UNITED STATES PATENT OFFICE 2,478,658

MECHANISM FOR TRANSFERRING A BODY FROM A TRAILER CHASSIS TO A TRUCK CHASSIS AND VICE VERSA

Henry C. Harbers, San Gabriel, Calif., assignor to Howard F. Cook and Charles E. Cook, a copartnership operating under the name and style of Cook Bros., Los Angeles, Calif.

Application March 8, 1946, Serial No. 652,848

4 Claims. (Cl. 214—38)

My invention relates generally to motor vehicles and trailer vehicles therefor, and particularly to motor trucks and trailer combinations of the type disclosed in United States Letters Patent No. 1,915,883, issued to A. F. Fager, June 27, 1933, designed for transferring loose materials such as sand, gravel, grain, and the like from the trailer to the truck, wherein a load-carrying body is removably mounted on a trailer chassis which is of a size to be telescopically moved into and carried by a truck body, and whereby through certain manipulations of the truck relative to the trailer a mechanism is operated to transfer the trailer body from the trailer chassis to the truck body, to in turn, transfer the material from the trailer to the truck. Following unloading of the trailer body it can be returned to the trailer chassis, by the same mechanism.

The Fager mechanism is not only structurally complex and, hence, expensive, but to accomplish a complete transfer of the trailer body into the truck body, it requires several separate and distinct truck manipulations which are both tedious and time consuming. Also, the mode of transfer is such as to compel complete suspension of the load-carrying trailer body between the truck and the trailer, which introduces the danger of distorting the concurrently extended sub-frame of the trailer, as well as tilting the trailer, and possible derailing of the trailer body on the sub-frame, or derailing of the sub-frame on the trailer frame. To return the trailer body to the trailer once it has been unloaded, the Fager invention requires hoisting of the truck body, and, therefore, his invention is restricted in its use to dump trucks.

It is a purpose of my invention to provide a truck-actuated mechanism of the type described which is structurally characterized by its simplicity and low cost of manufacture, and functionally by the reduced number of truck manipulations required to accomplish a complete transfer of the trailer body into the truck body, and thus expediting such transfer.

Another purpose of my invention is the provision of a trailer body transferring mechanism which, in the process of transfer avoids complete or such partial suspension of the trailer body between the truck and the trailer chassis, as would prevent possible distortion of the sub-frame or tilting of the trailer chassis, thus insuring at all times the successful performance of the transferring operation as well as restoring of the trailer body to the trailer chassis.

A further purpose of my invention is the provision of a mechanism which is operable to restore the trailer body to the trailer chassis without the necessity of hoisting the body, if desired, and thereby permitting the mechanism to be used with trucks having bodies capable or not of being dumped.

Broadly stated my invention embodies a mechanism which includes a sub-frame mounted for rolling movement on a trailer chassis, a trailer body mounted for rolling movement on the sub-frame, and means so constructed and arranged that upon advance movement of the sub-frame on the chassis by a truck, to transfer the trailer body onto the truck chassis, or upon retracting movement of the sub-frame to restore the trailer body to the trailer chassis, by the truck, the distance which the trailer body travels in its advancing or retracting movements will be greater than the distance traveled by the sub-frame and to such an increased degree that the sub-frame activating movements of the truck are reduced in number, distance, and direction, and thus transfer of the trailer body from the truck chassis to the trailer chassis, and vice versa, is greatly expedited.

I will describe only four forms of trailer body transferring mechanisms, and will then point out the novel features thereof in claims.

In the accompanying drawings:

Fig. 1 is a view showing in side elevation a trailer coupled to a dump truck in the conventional manner for transporting materials and embodying one form of transferring mechanism embodying my invention.

Fig. 2 is a view similar to Fig. 1, showing the first operation in transferring the trailer body to the truck body.

Fig. 3 is a view similar to Fig. 2, showing the second operation in transferring the trailer body to the truck body.

Fig. 4 is a view similar to Fig. 3, showing the third and last operation in transferring the trailer body to the truck body.

Fig. 5 is a view similar to Fig. 4, showing the operation of returning the trailer body to the trailer chassis.

Fig. 6 is a view on an enlarged scale, showing in longitudinal section the trailer and the transferring mechanism in the position of Fig. 2 the trailer body being in elevation.

Fig. 7 is a view similar to Fig. 6, but showing the trailer body partly extended into the truck body.

Fig. 8 is a vertical transverse sectional view taken on the line 8—8 of Fig. 6.

Fig. 9 is a fragmentary vertical sectional view taken on the line 9—9 of Fig. 7.

Fig. 10 is a view similar to Fig. 8 showing a modified form of trailer sub-frame and body mounting embodying my invention.

Fig. 11 is a vertical fragmentary sectional view similar to Fig. 6, showing another form of transferring mechanism embodying my invention, which is adapted for use in conjunction with a truck having a fixed or non-dumpable body, and wherein the truck is coupled to the sub-frame, and the trailer body is on the sub-frame ready for transfer to the truck.

Fig. 15 is a schematic view showing in side elevation and on a reduced scale a fourth form of transferring mechanism embodying my invention.

Fig. 16 is a fragmentary plan view of a part of the mechanism shown in Fig. 12 as seen on line 16—16 of Fig. 15.

Fig. 17 is an enlarged sectional view taken on the line 17—17 of Fig. 16.

Figure 12:
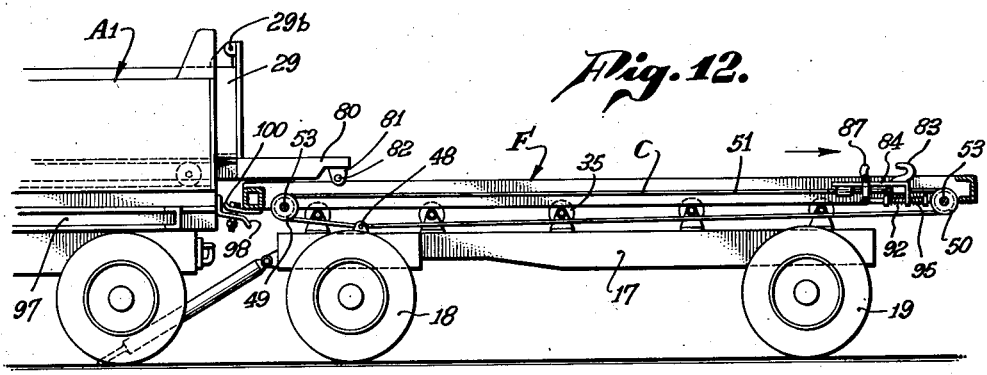
Fig. 12 is a view similar to Fig. 11, somewhat schematic, and showing the trailer body transferred to the truck body.

Having specific reference to Figs. 1 to 9 of the drawings, this embodiment of my invention comprises a conventional dump truck, designated generally at A, and my improved form of trailer designated generally at B. The truck A has the usual chassis frame 15 supported by front steerable wheels (not shown), and rear driving wheels 16 suspended by leaf springs 16a, and adapted to be driven from the usual power plant in any well known manner.

The trailer B embodies the usual chassis including a frame 17 supported on steerable front wheels 18 and rear wheels 19 through leaf springs 18a and 19a respectively in the conventional manner. The draft and steering connection between the truck and trailer may be in the form of a tongue 20 connected to the front wheels 18, and pivotally connectible with the truck frame 15 by an eye 21 engaging a hook 22.

The body 23 of the truck which is of box-like form and open at its rear end, is supported on and fixed to a frame 24 pivoted at its rear end on a cross shaft 25 (see Fig. 5). Hoisting mechanism (not shown) of any conventional form may be provided to tilt the body 23 from the position shown in Fig. 1, to the position shown in Fig. 5, and vice versa. This body is provided with the usual tail-gate 26 hingedly mounted as at 27 on brackets 28, and suitable means (not shown) such as that disclosed in Fager's aforesaid patent, may be provided for holding the gate in open position during the trailer body transferring operations.

The trailer B includes a body 29 likewise of box-like construction open at its rear end, but normally closed by a tail-gate 29a pivoted as at 29b. This body is of such dimensions as to permit it to be telescoped with the truck body 23. For this purpose it is removably mounted on the trailer frame 17 through the medium of a sub-frame F displaceable or extensible longitudinally on the trailer frame from the retracted position shown in Fig. 2 to the extended position shown in Fig. 3.

The sub-frame F is of rectangular configuration and may be formed of I-beam side members 30 and transverse end members 31 and 32. Secured to the side members are upper tracks 33 and lower tracks 34 in the form of channel members opening upwardly and downwardly respectively, and extending longitudinally of and parallel to the longitudinal center of the trailer frame 17.

The frame F is supported for longitudinal movement on the frame 17 by a plurality of non-friction rollers 35 mounted in brackets 35a secured to the side of the frame 17, and spaced apart along the length of the frame. On these rollers 35 ride the tracks 34, the flanges of the tracks confining the frame to longitudinal rolling movement on the frame 17. Likewise mounted in brackets 36 secured to the underside of the trailer body 29, are non-friction rollers 37 which ride on the upper tracks 33 to support the trailer body for rolling movement longitudinally on the sub-frame F.

While the sub-frame F is freely movable longitudinally on the trailer frame 17, and the trailer body 29 is freely movable longitudinally on the sub-frame, normally both the body and the sub-frame are held against movements and in the relative positions shown in Fig. 1, by any suitable securing means. Such means, in the present instance, comprises arms 38 pivoted at 39 on brackets 40 secured to opposite sides of the trailer frame 17, and which arms are detachably held between the arms of other bracket 41 secured to opposite sides of the trailer body 29, by removable pins 42. An arm 38 is shown in securing position in Fig. 1, and in non-securing position in Fig. 2.

For limiting rearward movement of the trailer body 29 on the sub-frame F and to the retracted position shown in Fig. 2, one or more stops 43 are provided at the rear end of the sub-frame to engage the rear end of the trailer body.

Coupling members 44 in the form of ramps are provided on the rear end of the dump body frame 24 so as to be vertically movable by tilting the body 23. Complemental coupling members 45 in the form of hooks are fixed on the forward end of the sub-frame F, and positioned to be in longitudinal alinement with the members 44 to engage one with the other when the truck is backed into the trailer to couple the sub-frame to the body frame 24 (see Fig. 7). These coupling members 44 and 45 may be of the same construction as the corresponding coupling members shown in the aforesaid Fager patent.

The trailer body supporting means is so constructed that the height of the surfaces of the tracks 33 on which the rollers 37 ride, are normally the same height above the ground as the top surface of the bottom 23a of the truck body, when both are loaded. However, when the truck body is empty and the trailer body loaded, the tracks 33 are thereby lowered beneath the level of the bottom 23a. The coupling members 44 and 45 are so positioned that when the members 45 engage members 44, the top surfaces of the tracks 33 will be elevated into the plane of the body bottom 23a.

For actuating the sub-frame F to cause it to occupy extended and retracted positions relative to the trailer frame 17, under forward and rear movements of the truck, and to thereby transfer the trailer body to the truck body, the following mechanism is provided.

To a fixed cross-member 46 at the front end of the frame 17 are ears 47 fixedly supporting a pin 48 to which the opposite ends of a cable C are dead-ended or secured. One end of this cable is extended upwardly around a front sheave 49, then rearwardly to a rear sheave 50 to form an upper stretch 51, and then downwardly from the sheave 50 to the pin 48 to form a lower stretch 52. These sheaves 49 and 50 are rotatably mounted on pins 53 in ears 54 fixed to angle bars 55 reversely disposed and spaced to form a guide track which extends centrally and longitudinally of the sub-frame with its ends fixed to the end members 31 and 32.

To the upper cable stretch 51 is secured by a two-part clamp 56 a plate-like member 57 (see Fig. 8) slidable on the track bars, the clamp being between the bars to confine the plate to movement axially along the guide track. A connector 58, in the form of a hook, is fixed to the upper side of the member 57 so as to face forwardly on the sub-frame F and engage a cross pin 59 fixed in ears 60 depending from a cross beam 61 secured to the underside of the trailer body 29 adjacent its rear end.

Also embodied in the transfer mechanism is an unbalanced lever 62 pivotally mounted adjacent its forward end, as at 63, on a vertically disposed bracket 64 rigidly fixed to the cross member 46 so as to extend upwardly at the forward end of the sub-frame.

As in the aforementioned Fager invention, the trailer body 29 having been moved into the truck body, is automatically latched therein by one or more latches 65 (see Fig. 6) pivoted as at 66 on the outer side of the trailer body and urged by a spring 67 into engagement with a stop lug 68 on the body, so as to ride over and into engagement with a keeper bar 69 (Fig. 4) fixed in the truck body adjacent its forward end.

The operation of the truck and trailer above described, is as follows: The two vehicles are coupled in tandem for transportation through engaging the hook 22 in the eye 21. If the bodies 23 and 29 are loaded the tail gates 26 and 29a are closed and latched by any suitable means (not shown), and the parts are all in what may be termed their normal positions, as shown in Fig. 1.

Assuming that both bodies 23 and 29 are loaded when the scene of dumping is reached, the trailer is uncoupled from the truck by disengagement of the eye 21 from the hook 22. The driver then proceeds with the truck and dumps its load at the desired location. He then returns, and the first operation in transferring the trailer body 29 to the truck body 23 is backing the truck up to the forward end of the trailer so that it is in longitudinal alinement therewith. As the truck has been dumped, and the load still remains on the trailer, and as the surfaces of the tracks 33 are normally at the level of the top surface of the bottom 23a of the truck body, when both are loaded, the bottom 23a will, of necessity, be at a higher level than the surfaces of the tracks 33. As the truck is backed up in alinement with the trailer, the hook members 45 will ride up on and engage the ramp members 44 where they will be held by the load upon the sub-frame F. Although, in this coupling operation, the forward end of the sub-frame is lifted, such elevation of the sub-frame is compensated for, to maintain the tracks 34 on the rollers 35, by the forward trailer springs 18a which had been depressed by the weight of the load on them, reacting to correspondingly raise the trailer frame.

After the truck and trailer have been thus coupled (see Fig. 2), the tail gate 26 opened and the arm 38 swung to the down position shown in Fig. 2, the truck is moved forwardly, under its own power, from the position shown in Fig. 2 to that shown in Fig. 3, drawing forwardly and extending the sub-frame F on the trailer frame. Under extension of the sub-frame the cable C is set into operation to advance the trailer body 29 on the sub-frame, in the following manner: The cable ends being dead-ended on the trailer frame such ends do not advance with the sub-frame, but the sheaves 53 and 54 being mounted on the sub-frame, are advanced. As a result the upper cable stretch 51 is caused to travel at twice the speed of the sub-frame and to move the hook 58 accordingly. Initial movement of the hook 58 causes it to engage the pin 59 and draw the trailer body forwardly on the sub-frame, and as the speed of travel of the hook is twice that of the sub-frame, the distance of travel of the trailer body will be twice that of the sub-frame. Thus from Fig. 3, it will be seen that although the sub-frame is only partly extended from the trailer frame, the trailer body is already extended into the truck body and partly supported by the truck.

This partial extension of the sub-frame and the partial support of the trailer body and its load by the truck, provides two important advantages, namely, it avoids complete extension of the sub-frame with the trailer body and its load thereon, to prevent resultant distortion of the sub-frame, as well as a possible tilting of the trailer to derail the sub-frame and the trailer body.

In the advanced position of the trailer body shown in Fig. 3, but better shown in Fig. 7, the rear end of the body has passed over and is now engaged by the lever 62, to hold the trailer body against rearward movement on the sub-frame.

The next and final operation necessary to completely pass the trailer body into the truck body, is the backing of the truck into the trailer, that is, from the position shown in Fig. 3 to that shown in Fig. 4. During this truck manipulation, the trailer body being held by the lever 62 against rearward movement, and the truck body moving rearwardly on the trailer body, the latter is caused to telescopically pass almost completely into the truck body, that final movement necessary to fully extend it into the truck body being given by the thrust imparted thereto by the rapidly moving hook 58 before it disengages the pin 59. In the final position of the trailer body, the latches 65 spring into engagement with the keeper bar 69 to secure the trailer body fully extended into the truck body.

During the above described transfer of the loaded trailer body, the tracks 33 being relieved of this load, the sub-frame F will be raised by the action of the trailer springs 18a and 19a, thus lifting the members 45 free of the members 44, and disengaging the track and trailer. Following this, the end-gate 29a is released when the load may be dumped by tilting the truck body in the usual manner.

When the transferring operation is completed as shown in Fig. 4, the sub-frame F is left in its normal position upon the trailer frame. After dumping the trailer load the truck is then returned and again backed up to the trailer, in proper alinement therewith, to cause the members 45 to again ride up onto and engage the members 44. To return the trailer body to the trailer frame, the latches 65 are first moved free of the keeper bar 69, and the end gate 29a unlatched, whereupon the truck body is tilted in the manner illustrated in Fig. 5, causing the trailer body to roll by gravity onto the tracks 33, when the trailer body may be secured in place by the arms 38. Transporting connection is then made by engagement of the eye 21 within the hook 22.

It will be noted that when the truck is backed into the trailer as described in connection with Fig. 4, the sub-frame F, in its return to normal position, will actuate the cable C to restore the hook 58 to its normal position at the back end of the frame to be in a position to engage the pin 59 when the hook is again advanced to effect a second transfer of the trailer body into a truck body.

Referring now to Fig. 10, I have here shown a modified construction of sub-frame designated generally at F1, and a different manner of supporting the trailer body 29 for rolling movement in respect to the trailer frame 17. In this construction, a pair of I beams 70 extend longitudinally of and are secured to the upper side of the frame 17, while secured to the upper edges of the beams are a pair of tracks 71. Rollers 72 mounted in suitable brackets 73 secured to the underside of the trailer body 29, ride on the tracks 71. From this construction it will be seen that the trailer body is directly supported on the trailer frame, rather than on the sub-frame as in the first form of my invention.

The sub-frame F1 is arranged between the beams 70, and comprises a pair of channel beams 74 suitably fixed to each other in spaced parallel relation. These beams are supported for rolling movement on and longitudinally of the trailer frame, by rollers 75 riding on tracks 76 secured to channeled beams 17a of the frame 17. The rollers 75 are mounted in pairs at the sides of the beams 74, with the lower flanges of the beams formed with slots 77 through which the rollers extend to ride on the tracks 76.

While not shown, the forward end of the sub-frame may be provided with a coupling member 45 adapted to engage a truck-carried coupling member 44 to couple the sub-frame to the truck frame 24 in the same manner as with the sub-frame F. Also, the forward end of the sub-frame F1 may be provided with an unbalanced lever 62 to engage the rear end of the trailer body for holding the body against rearward movement on the sub-frame to effect the body transfer to the truck.

As in the first form of my invention, the sub-frame F1 is adapted to actuate a cable C, the ends of which may be fixed to the trailer frame 17 as in Fig. 7, and trained about two sheaves 78 mounted between the beams 74, only one of the sheaves appearing in Fig. 10. The upper stretch 51 of the cable C is, likewise, secured to a plate 57 which rides on the upper flanges of the beam 74, through the medium of a clamp 56. The plate 57 carries a hook 58 which is adapted to engage a pin 59 fixed in ears 60 on the underside of a cross beam 61 secured to the bottom of the trailer body 29.

In the operation of the sub-frame F1 to effect transfer of the trailer body into the truck body, the sub-frame does not act as a bridge for the trailer body as in the first form of my invention. The trailer body being supported directly on the trailer frame, acts as its own bridge, and this is made possible by the manner in which the cable C operates the sub-frame, for as the truck draws the sub-frame forwardly the trailer body is moved by the cable twice the distance of the sub-frame. Hence, the forward end of the trailer body will pass into the truck body while the trailer body is actually supported by the trailer. If the truck is initially moved forward with rapidity and for only a short distance, the resultant thrust imparted to the trailer body by the hook 58, will be sufficient to impel it in one continuous movement, into the truck body. However, because of the possible damage to the truck, unless the operator advances the truck the exact speed and distance required, it is best to resort to a second backing and forward movement of the truck as in the first form of my invention, to complete transfer of the trailer body into the truck body.

Referring to Figs. 11 to 14, I have here shown a modification of the transferring mechanism of Fig. 1, which is primarily designed to be used in conjunction with a truck having a fixed body rather than a dump body. In this form of my invention, the same main elements as in the form of my invention shown in Fig. 6 are employed, that is, the trailer frame 17, the sub-frame F, the lever 62, and the cable C in the same association with the sub-frame and the trailer frame to actuate the trailer body all as shown in Fig. 11. However, the coupling members 44 and 45 are not here useable, and hence other coupling means is provided which will be later described herein.

In addition to the foregoing elements a rigid extension 80 is fixed to the rear end of the trailer body 29, and on this extension is fixed, in ears 81, a cross pin 82. For pulling the trailer body forwardly on the sub-frame, this pin 82 is engaged by a hook 83 fixed to a plate 84 slidable on the angle bars 55. The plate, in turn, is secured to the cable C by two clamps 56.

A lever 85 extends upwardly through and is fulcrumed on the plate 84, as at 86, the upper end of the lever being in the form of a hook 87 which faces the hook 83. As at 88, the lower end of the lever 85 is pivoted to the forward end of a rod 89 movable axially in a depending extension 90 of the plate 84. On the rod 89 between the extension 90 and a collar 91 fixed on the rod, is an expansible spring 92. Similarly, on the rod between the extension and a washer 93 secured on the rod by a nut 94, is an expansible spring 95 but of less tension than the spring 92. These two springs coact to return the hook 83 to a vertical position when moved in either direction therefrom.

The truck A1 shown in Figs. 11 to 14 is of the conventional fixed body type having a body 96 fixed on the frame 97, and provided at its rear end with a pair of horizontal coupling plates 98 formed with openings 99. Similarly, the forward end of the sub-frame F is provided with a pair of horizontal coupling plates 100 with openings 101 therein. These plates 98 and 100 are positioned on the truck and the sub-frame, so that when the truck is adjacent to and longitudinally alined with the trailer, the openings 99 and 101 register with each other, and by dropping a pair of bolts or pins 102 through the openings, the plates will be connected one to the other to couple the sub-frame to the truck.

Figure 13:
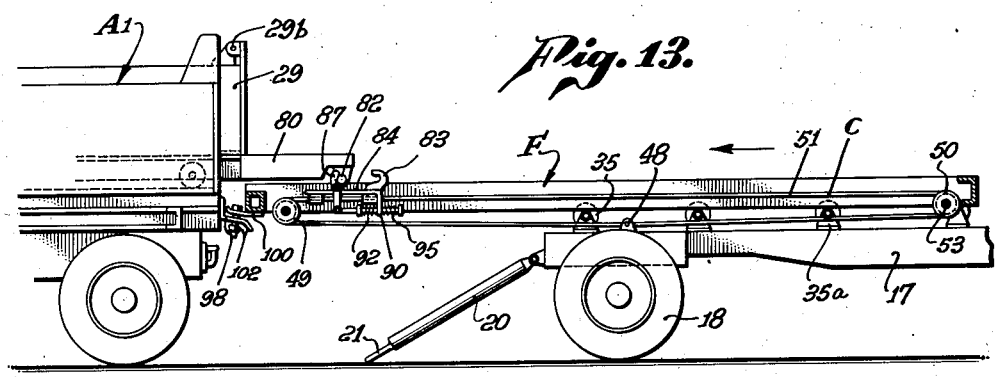
Fig. 13 is a view similar to Fig. 12, but showing the sub-frame advanced and operatively connected to the trailer body for transfer of the latter back onto the trailer.
Figure 14:
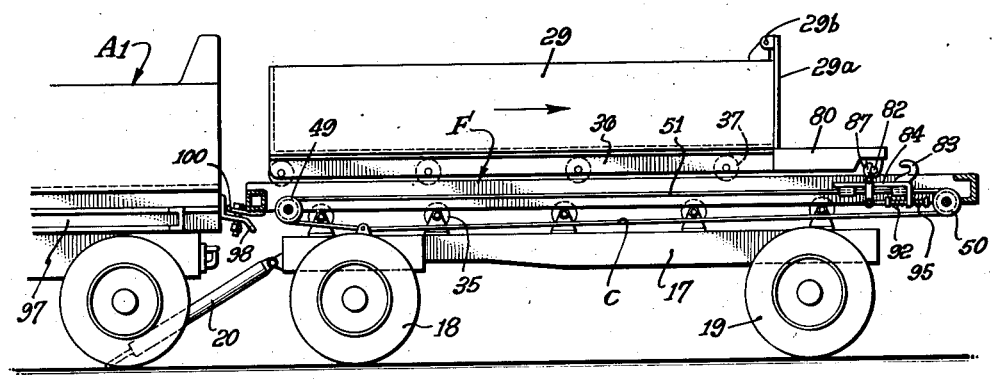
Fig. 14 is a view similar to Fig. 13 showing the trailer body transferred back to the trailer.

In the operation of this form of my invention, the cable C, under forward pulling of the sub-frame by the truck A1, once it is coupled thereto by the plates and pins described, is actuated to advance the trailer body through the hook and pin connection 83 and 82, at least twice the distance the sub-frame is moved on the trailer frame, to partly telescope the trailer body into the truck body. As in the first form of my invention, complete transfer of the trailer body is effected by backing the truck up to the trailer, with the lever 62 engaging the frame extension 80 and holding the trailer body against rearward movement. As the truck leaves the trailer following uncoupling of the two, the pin 82 leaves the hook 83 and strikes the hook 87, but the latter yields under compression of the spring 95 to allow the pin to pass.

Where the truck body 66 cannot be tilted to dump the trailer body, it is necessary to resort to other load-removing means, such, for example, as by use of a crane shovel, or by pulling the trailer body 29 from the truck A1 onto a platform, by a power operated winch. If the load is removed from the trailer body while the latter remains on the truck, the truck with the empty trailer body returns into longitudinal alinement with the trailer, where it is again coupled to the sub-frame (see Fig. 12), so that the trailer body may now be transferred back to the trailer, as follows:

The truck is moved forwardly drawing the sub-frame F forwardly to the partly extended position on the trailer frame, shown in Fig. 13. Under this advancement of the sub-frame, the cable C is actuated to move the hook 87 from the rear end to the forward end of the sub-frame. This may be accomplished by merely extending the sub-frame a portion of its length, because under the action of the cable the hook is moved forwardly twice the distance the sub-frame is moved. As the convex side of the hook engages the pin 82, the spring 95 yields to allow the hook to pass the pin, the latter coming to a stop at the forward side of the pin, as illustrated.

The next and final step is to again back the truck to the trailer to retract the sub-frame to its original position on the trailer. During this movement of the sub-frame the upper stretch of the cable C is moved rearwardly causing the hook 87 to engage the pin 82, and pull the trailer body from the truck body completely back onto the trailer (see Fig. 14). The hook 87 is held against forward movement and thus in engagement with the pin 82 by the strong tension of the spring 92. Incident to this transferring operation, it is necessary to block or otherwise hold the lever 62 out of the path of movement of the frame extension. As the hook moves twice the distance the sub-frame moves, the trailer body is restored to its original position concurrently with the sub-frame, in spite of the fact the sub-frame was only partially extended at the outset.

From the aforedescribed operation of this form of my invention, it will be manifest that through the mode of operation of the cable C, only a partial extension of the sub-frame is necessary during the operation of transferring the trailer body to the truck body, and vice versa, and, hence, only short movements of the truck forwardly and rearwardly. While I have described this form of my invention as used for transferring a trailer body to the fixed body of a truck, I do not desire to be limited or restricted to this use, as it will be understood that the trailer-carried transfer mechanism may be mounted on a wooden platform, or partly sunk in a concrete platform, and the body 29 used as the removable body of a truck. In this adaptation, the transferring mechanism could be operated on the platform in the manner as before, to effect transfer of the body 29 from the platform to the truck chassis, or vice versa, through the necessary manipulations of the truck with relation to the platform.

Referring to Figs. 15 to 17, I have here shown another form of trailer body transferring mechanism which is identical to the first form of my invention, with the exception of the manner in which the cable C is associated with the sub-frame F and the trailer frame 17.

In this embodiment, the cable C is anchored to the front end of the trailer frame 17, as at 48a, extended upwardly around a sheave 49a at the front end of the sub-frame, and then rearwardly along the sub-frame to form the upper stretch 51a, with its rear end coiled about and anchored to a winch drum 105. This drum is fixed to a shaft 106 journalled in two brackets 107 secured to a cross beam 108 extended between and fixed to the sides of the sub-frame F. To the shaft 106 is anchored the inner end of a coiled spring 109, its outer end being secured to a housing 110 fixed to the beam 108.

In operation, the spring 109 is under practically no tension when the sub-frame is in its normal retracted position, but as the sub-frame is extended forwardly, the sheave 49a is actuated to unwind the cable from the drum and to rotate the drum in so doing. This drum rotation serves to wind up the spring through rotation of the shaft 106, and thus place it under such tension that following transfer of the trailer body to the truck and uncoupling of the truck from the sub-frame, the spring will in its unwinding operation draw the sub-frame back to normal position and return the cable stretch 51 to its normal position to place the hook 58 in position for a succeeding transferring operation.

I claim:

1. In a mechanism for transferring a body from a trailer chassis to a truck and vice versa, a transferring frame movably mounted on the trailer chassis so as to be moved to extended and retracted positions relative thereto, said body being removably mounted on said frame, a sheave journalled at each end of said frame, flexible means looped over said sheaves with the lower stretch thereof being fixedly secured to the chassis, means on the upper stretch of said flexible means adapted to engage said trailer body adjacent the rear end thereof during the forward travel of said frame and to be released therefrom by the return thereof whereby said flexible means and said body are caused to move at a differential ratio relative to the frame and said body is moved substantially twice as far as said frame.

2. In combination: a truck; a trailer chassis; a body removably mounted on the trailer chassis; a frame movably mounted on said chassis; a hitch for connecting said frame with said truck; sheaves journalled in the frame adjacent the front and rear ends thereof; a flexible member extending and movable over said sheaves and having its ends anchored to said chassis; means on the upper stretch of said member adaptable to engage the trailer body at the rearward portion thereof whereby said body is moved at least twice the distance of the frame to transfer the body to the truck and vice versa when the truck is manipulated relative to the trailer chassis, the means on said flexible member being disengageable from the trailer body by the return movement of said frame.

3. In combination: a truck chassis having a body fixed thereon; a trailer chassis; a trailer frame; a trailer body of a size to telescopically pass into the truck body; rollers on said trailer chassis; tracks on said frame engageable with said rollers for moving said frame longitudinally of the trailer chassis; rollers on said trailer body engageable with said first mentioned rollers; complemental coupling means on said frame and truck chassis to permit the frame to be drawn forwardly and rearwardly on the trailer chassis when the truck is moved; means on said tracks for holding the trailer body against rearward movement thereon; a cable movably associated with said tracks and connected at one end to said trailer chassis; means on said cable engageable with said trailer body during forward movement of the tracks and frame whereby the body will be advanced thereon at a greater speed of travel than the frame to move the body telescopically into the truck body, and said cable means being disengageable with said trailer body by the return movement of the tracks and frame.

4. In combination: a truck; a trailer chassis; a frame movably mounted on said chassis; a body removably mounted on said frame; a sheave journalled in each end of said frame; a cable looped over said sheaves and connected to said chassis; hook means on said cable engageable with said body adjacent the rearward portion thereof whereby forward movement of the frame produces a movement in said cable in excess of the movement of said frame so that the body will be moved in either direction with the movement of said cable, said hook means being disengaged from said body by the return movement of said cable.

HENRY C. HARBERS.

REFERENCES CITED

The following references are of record in the file of this patent:

UNITED STATES PATENTS

| Number | Name | Date |
|---|---|---|
| 1,072,571 | Canham | Sept. 9, 1913 |
| 1,915,883 | Fager | June 27, 1933 |
| 2,018,360 | Heintges | Oct. 22, 1935 |